Figure 7:
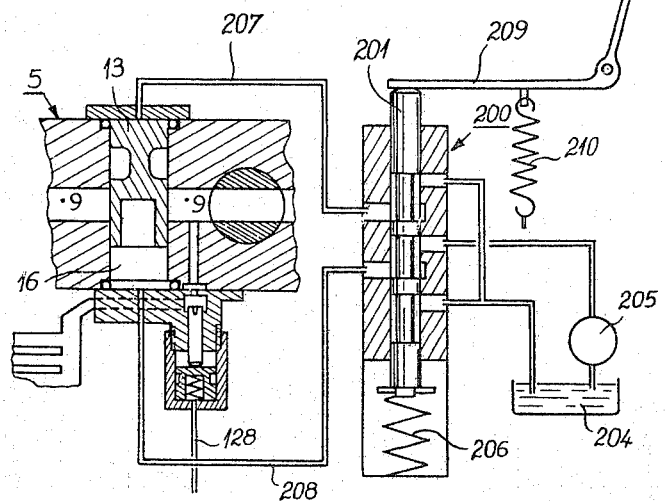

Dec. 13, 1966  E. HENRY-BIABAUD  3,290,958
SELF-BRAKING HYDRAULIC TRANSMISSIONS FOR MOTOR VEHICLES
Filed July 10, 1964  2 Sheets-Sheet 1
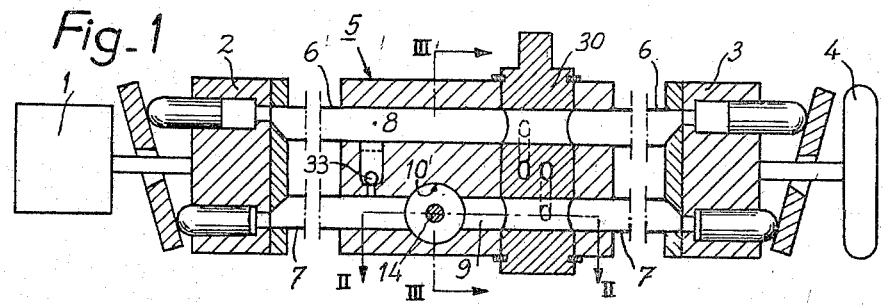
Fig. 1
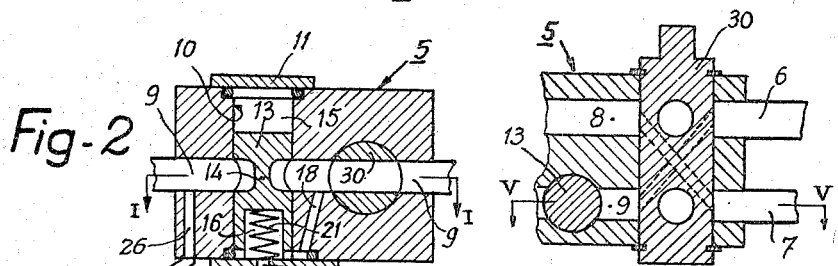
Fig. 2
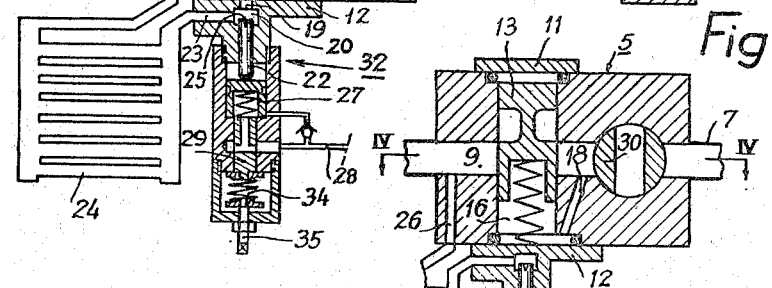
Fig. 4
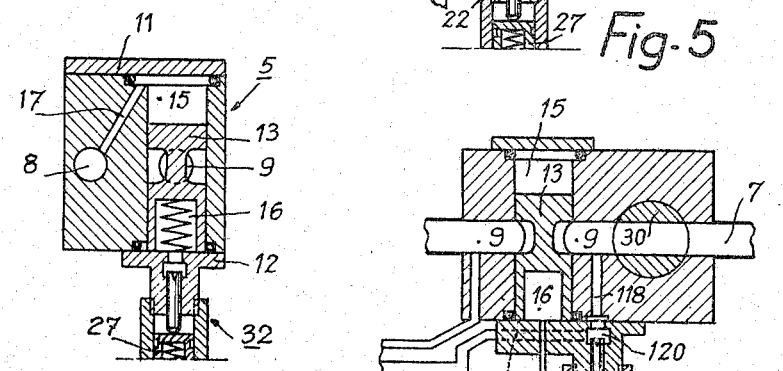
Fig. 3      Fig. 5      Fig. 6
Edmond Henry-Biabaud
Inventor
By Wenderoth, Lind & Ponack
Attys United States Patent Office 3,290,958
Patented Dec. 13, 1966

3,290,958
SELF-BRAKING HYDRAULIC TRANSMISSIONS FOR MOTOR VEHICLES
Edmond Henry-Biabaud, Paris, France, assignor to Societe Anonyme Andre Citroen, Paris, France, a corporation of France
Filed July 10, 1964, Ser. No. 381,729
Claims priority, application France, July 15, 1963, 941,490, Patent 1,370,742
8 Claims. (Cl. 74—472)

It is well known that in a motor vehicle hydraulic transmission system the vehicle can be totally or partially braked by causing the hydraulic elements which are associated to the wheels and normally act as motors to function as generators.

The liquid delivered by these elements is then set under pressure by a hydraulic impeder which is adjustable by the driver's action on the brake pedal. This hydraulic impeder must be highly sensitive and must be free from an operating threshold, vibration and hysteresis; moreover, the head given off during braking must be evacuated without interfering with operation of the hydraulic circuit. In addition, when the vehicle is being driven, the loss of pressure introduced by the presence of this impeder must be negligible.

Heretofore, recourse has been had to various types of hydraulic impeders almost all of which are basically valves for adjustably constricting the liquid return passage and therefore in fact only imperfect compromises between the requirements set forth above.

It is the object of the present invention to resolve this problem and to accordingly provide a hydraulic transmission system which is essentially characterized in that the adjustable hydraulic impeder is inserted, in series with a radiator, into an auxiliary circuit connected between two points along the oil return passage, within which passage, between said points, is placed a hit-or-miss type valve which is so controlled that it may cause said auxiliary circuit to be connected into the oil return circuit when the vehicle is on the overrun (i.e. not positively driven) but allow the return flow of oil to pass freely through the passage normally provided for the purpose, when the vehicle is being positively driven.

Various methods of controlling such a valve may be envisaged within the spirit and scope of the invention. By way of example, the obturator member thereof may be operated by the pressure differential across the oil delivery and return passages. Alternatively, it may be operated by the accelerator pedal through a suitable hydraulic system.

Figure 8:
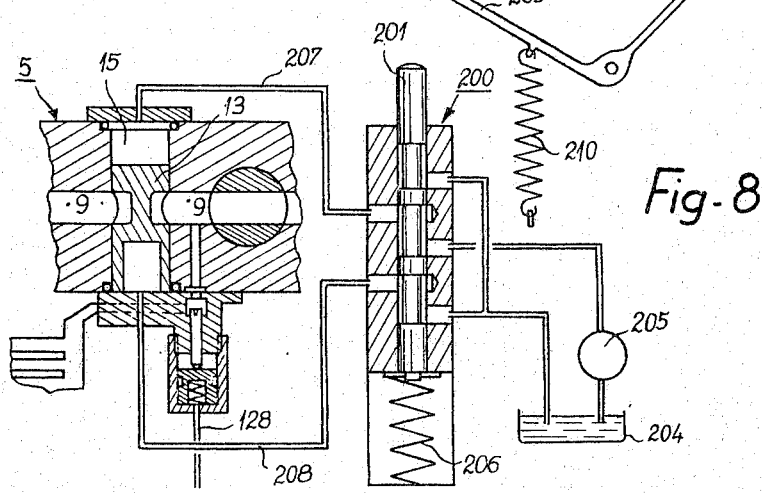

Embodiments of the invention will now be more particularly described, by way of example, with reference to the accompanying drawing, in which FIGURE 1 shows in section the various component parts of a transmission system according to the invention;

FIGURES 2 and 3 are sections taken through the lines II—II and III—III, respectively, of FIGURE 1;

FIGURES 4 and 5 respectively illustrate portions of FIGURES 1 and 2 in different states;

FIGURE 6 is a sectional view corresponding to FIGURE 2 of a first alternative embodiment of the control means of the hydraulic impeder; and FIGURES 7 and 8 show another alternative embodiment of the valve control means.

A transmission system according to the invention (see FIGURE 1) comprises a hydraulic generator 2 driven by the vehicle engine 1, at least one hydraulic element 3 operatively connected to the wheels 4 which it drives when the vehicle is under traction, and an intermediate element 5 comprising the subject restraining system of this invention.

Reference to FIGURES 1 to 3 shows that the element 5 has formed therein two parallel ducts 8 and 9, of which the former is inserted into the oil delivery passage 6 (from the generator 2 to the element 3) and the latter into the main oil return passage 7 (from the element 3 to the generator 2).

A bore 10 which extends through the element 5 and intersects the duct 9 at right angles is sealed off at one end by a fluid-tight cover 11 and at the other end by the main casting 12 of a hydraulic impeder 32. Within bore 10 is slidable a part 13 which is the obturator of a powerful high-speed valve adapted to open or close the liquid passageway through the duct 9.

Over a portion of its length said obturator embodies a thinned-down section 14 which, when the valve is in the open position (see FIGURE 2), produces a minimum loss of pressure. FIGURES 5 shows the valve in the closed position.

The obturator 13 bounds within the bore 10 two chambers 15 and 16. In a first constructional form, the chamber 15 communicates with the duct 8 through a small duct 17 (FIGURE 3) and the chamber 16 communicates with the duct 9 through a small duct 18 (FIGURE 2). A spring 21 in the chamber 16 bears against the obturator and urges it towards the cover 11. The hydraulic impeder 32 consists of a main casting 12 through a bore of which is slidable the obturator 22 of an adjustment valve having port in a chamber 20. The volume of this chamber is determined by the degree of penetration of the obturator 22 and communicates with the chamber 16 through an orifice 19 and with a radiator 24 through a duct 23. The radiator 24 has its outlet end connected to the duct 9, downstream of the value 13, through a small duct 26. In order to make its action progressive at small flow rates, the obturator 22 is slotted at 25.

Penetration of the obturator 22 is controlled by an actuator whose piston 27 is in turn operatively displaced by oil under pressure conveyed from the brake master cylinder through the pipe 28. If desired, a pressure limiting valve 29 calibrated by a spring 34 whose tension can be adjusted by a screw 35 may be added, notably in instance where the hydraulic transmission elements (particularly the motors 3) are not designed to withstand the high pressures required to lock the wheels and are capable of acting only as a restraining agent (in which case the complementary mechanical brake would incorporate an operating threshold in order to preserve correct braking distribution at all times).

A reversing valve 30 may be incorporated in the element 5, and this valve is shown in the normal or forward travel position in FIGURES 1 to 3 and in the reverse position in FIGURES 4 and 5.

As reference to FIGURE 1 shows, a connection between ducts 8 and 9 is provided through a check valve 33 which allows the oil to flow from duct 9 to duct 8 but not in the opposite direction.

A transmission system as hereinbefore disclosed functions in the following manner:

When the vehicle is under traction the duct 8 of element 5 has high pressure liquid flowing through it and the duct 9 has low presure return liquid flowing through it, the check valve 33 being closed.

The chamber 15 communicating with the duct 8 is therefore at high pressure while the chamber 16, which communicates with the duct 9, is at low pressure. The obturator 13 is consequently powerfully maintained in the open position against the countering spring 21.

The oil return flow therefore passes through the duct 9, into which the obturator 13 introduces only a minimum pressure loss by virtue of its portion 14. A small oil flow is by-passed into the hydraulic impeder circuit via 18, 16, 19, 20, 23, 24 and 26.

As soon as the traction force ceases, the pressure drops in duct 8 and chamber 15, and before it can rise in duct 9 and chamber 16 in response to an effective braking action, the spring 21 abruptly thrusts back the obturator 13 and closes the duct 9, causing the liquid otherwise flowing therethrough to pass in its entirety through the by-pass circuit.

As will be readily understood, the liquid in passing through the chamber 20 will be damped to an extent dependent upon the degree of penetration of the rod 22.

In the absence of any braking action on the part of the driver, the obturator 22 will be in its lowermost position and the impeder 32 will have a minimum effect.

When the driver wishes to accentuate the retardation and to exert effective braking, he presses the brake pedal and this in turn operates the brake master cylinder followed by the actuator 27, which in turn causes the obturator 22 to be thrust inwardly. The effect of the impeder 32 then increases, providing a corresponding braking effect.

As soon as the vehicle is under traction once more, the pressures in chambers 15 and 16 are reversed and the obturator 13 abruptly reopens the passageway through duct 9.

In an alternative constructional form shown in FIGURE 6, the by-pass circuit extends via a duct 118 and the hydraulic impeder chamber 120, and thence directly via the passage 123 leading to the radiator, without communicating with the chamber 16. The latter is supplied through a separate line 31 from an independent source of pressurized liquid (for instance from the so-called "servo system" of the vehicle). This liquid pressure replaces the spring 21 used in the previously described form of embodiment.

The manner of operation in this particular constructional form is manifestly identical to that described with reference to the constructional form described precedingly, except that in this case only the pressure in chamber 15 operates to displace the obturator 13, since the pressure in chamber 16 remains constant.

In both of the forms of embodiment described hereinabove, the brake master cylinder also brakes the wheels of the non-driving axle.

The determination of the effectiveness of the hydraulic impeder and of the power of its actuator must therefore be made in such manner as to distribute the restraining torques over the two axles as a function of the load each must withstand.

In yet another alternative form of embodiment (see FIGURES 7 and 8) of the control means of the "hit-or-miss" valve, the chambers 15 and 16 of this valve communicates, through passages 207 and 208 respectively, with a distributor 200 which is in turn connected into the vehicle servo-system, i.e. between the pump 205 and the discharge tank 204.

The slide 201 of said distributor is biased upwardly (with reference to FIGURES 7 and 8) by a spring 206 and downwardly by the spring 210 which operates on the lever 209 rigid with the accelerator pedal 203.

When this pedal is released (FIGURE 7), the more powerful spring 210 fully raises the pedal and thrusts in the slide 201 against its countering spring 206; the distributor then sets the chamber 16 under pressure and places the chamber 15 in communication with the discharge tank, so that the valve obturator 13 is in the closed position.

Provided the driver does not operate the brake pedal, the braking circuit will remain in this configuration, with the hydraulic impeder at minimum value.

If the brake pedal be subsequently operated, the braking effect will augment proportionately, as stated precedingly.

If, on the contrary, the accelerator pedal is depressed, even only slightly (FIGURE 8), the slide 201 of distributor 200 will rise in response to its associated spring 206. This causes the chamber 15 to be set under pressure instead, and the chamber 16 to be placed in communication with the discharge tank: the obturator 13 therefore abruptly redescends and opens the valve to permit operation under normal traction conditions.

I claim:

1. A hydraulic transmission system for motor vehicles, comprising a first normally generating element connected to the vehicle engine and a second normally driving element mechanically connected to the vehicle wheels and hydraulically connected to said first element through an oil delivery duct and an oil return duct, utilisable as a brake by insertion into the oil return circuit of a hydraulic impeder which is progressively adjustable by the brake pedal, characterized in that said hydraulic impeder is inserted into an auxiliary circuit connected between two points located along said oil return duct and between which is provided, within said duct, a hit-or-miss type valve which is controlled in such manner as to cause said auxiliary circuit to be connected or not into said oil return circuit accordingly as said vehicle is travelling on the overrun or under traction, respectively.

2. A hydraulic transmission system according to claim 1, wherein said adjustable hydraulic impeder is a valve the obturating element of which is operated by an actuator which is in turn controlled by the brake pedal of the vehicle through the brake master cylinder.

3. A hydraulic transmission system according to claim 1, wherein a radiator is inserted into said auxiliary braking circuit downstream of said hydraulic impeder.

4. A hydraulic transmission system according to claim 1, wherein the portion thereof in relation with said hydraulic impeder is a block embodying therein two parallel ducts of which the first is inserted into said oil delivery circuit and the second into said oil return circuit, said second duct being intersected at right angles by a bore within which the obturator of said hit-or-miss valve is slidable to bound therein two chambers receiving fluid under pressure whereby to respectively open and close said valve.

5. A hydraulic transmission system according to claim 4, wherein the first of said valve control chambers communicates with said first duct.

6. A hydraulic transmission system according to claim 4, wherein said second valve control chamber contains an obturator repelling spring and communicates with the second of said parallel ducts.

7. A hydraulic transmission system according to claim 4, wherein said second valve control chamber contains an obturator repelling spring and communicates with an independent source of liquid under substantially constant pressure.

8. A hydraulic transmission system according to claim 4, wherein the chambers formed in the bore of said hit-or-miss valve are supplied by a distributor slide-valve whose slide is controlled by the vehicle accelerator pedal in such manner that said hit-or-miss valve be opened as soon as said pedal is even slightly depressed and be closed as soon as said pedal is no longer depressed.

References Cited by the Examiner

UNITED STATES PATENTS

| | | | |
|---|---|---|---|
| 2,598,538 | 5/1952 | Haynes | 60—53 X |
| 2,907,230 | 10/1959 | Kollman | 60—53 X |
| 3,059,416 | 10/1962 | Campbell. | |
| 3,153,900 | 10/1964 | Pigeroulet et al. | 60—53 X |
| 3,199,286 | 8/1965 | Anderson | 60—53 X |

DAVID J. WILLIAMOWSKY, *Primary Examiner.*

LEONARD H. GERIN, *Examiner.*